Patented June 16, 1931

1,810,662

UNITED STATES PATENT OFFICE

WOLF KRITCHEVSKY, OF CHICAGO, ILLINOIS

COMBINED DYE AND STRIPPER

No Drawing. Application filed October 23, 1929. Serial No. 401,983.

My invention consists in a mixture of chemicals having the function of removing color and affixing a color in the same operation.

There are on the market many dye combinations, that is, dyes combined with carriers or assistants such as soap, mordants, etc. There are also numerous strippers or color removers to be had, but there has been, so far as known, no attempt made to physically combine or intermix a stripper and a dye for household use. Such a compound has numerous advantages, one of the important of which is that of convenience and simplicity of operation. For example, one having a dark colored garment and wishing to dye it a different and lighter color, would, under the known practice, place the garment in a vessel with a solution of the stripping agent, boil it until the original color was removed, and then remove and rinse the garment thoroughly and then repeat the operation in a dye solution of the desired color. This operation requires considerable time, a number of different vessels and some degree of skill for good results.

By utilizing the product and following the process outlined herein, the complete operation of removing old color and applying a new color is performed simultaneously in a single vessel and in the same time that was required for one of the operations in the old process.

The majority of the dyes commonly used are decolorized by stripping compounds that release hydrogen, such as zinc dust and an acid reacting substance, or a hydrosulphite salt, or a sulphoxylate salt with or without acid reacting substances.

There are other less common dyes that are affected by such stripping agents only to the extent that they are rendered colorless only so long as they are in the presence of the reducing agent, and that on exposure to the air, take on an atom of oxygen and are restored to their original color. This process is discussed in my copending application.

There are other dyes that are not affected in any way by the stripping agents commonly used and which may be combined therewith for simultaneous use. This will constitute the subject of this application.

An example of the compound which will operate as specified is as follows: 2 ounces of a red dye such as Chlorazol Fast Scarlet, 4 B S color index No. 327, and 2 ounces of a stripping agent such as sodium hydrosulphite dissolved in approximately a half gallon of water. The solution has a red color which is the color of the dye which is not affected by the use of this reducing agent.

A fabric that may be of a black color, for instance, is then immersed in the solution and heated to whatever temperature necessary for a period of from ten to thirty minutes. The black dye that has previously been attached to the fabric will be destroyed by the reducing agent and the red dye present in the solution that is not destroyed by the reducing agent will adhere to the fabric and the fabric will become colored red. After the fabric has assumed the proper color as to shade and strength, it is taken out, washed free of the excess reducing agent and dye, dried and ironed. This way we manage to dye the black garment red.

Numerous other dyes of different colors may be used instead of the dye mentioned, for instance, Thiazol Yellow R, color index 43. For violet, Erie Violet 2 B color index No. 471 can be used. For blue, Natural Wool Blue G, color index 209 can be used.

Instead of sodium hydrosulphite as a reducing agent, other chemicals may be used, such as zinc dust, and sodium bisulphite, or basic zinc sulphoxylate and sodium bisulphite or sodium sulphoxylate and an acid reacting substance, and any other similar reducing agents like stannous chloride, and sulphur dioxide, etc.

The compound may be manufactured and sold in powdered form, in a solution of water, alcohol or other solvent, or in any intermediate solid or semi-solid form. If desired, other chemicals may be added as diluents, like salt, starch or sugar, or mordants such as chromium salts, or dye assistants, such as substituted naphthaline sulphonic acid salts, commercially known as "Nekal", Mixtures of dyes may also be used with like effect.

I claim:

1. A composition of matter in solid form adapted to be dispensed in packages and to be combined with a liquid for simultaneous dyeing and stripping consisting of chemicals that will evolve hydrogen in the presence of water and strip color from fabrics, and water soluble dyes that will not be affected by the reducing agents and dye the fabric the color of the dye used.

2. A composition of matter in solid form adapted to be dispensed in packages and to be combined with a liquid for simultaneous dyeing and stripping consisting of a mechanical mixture of dye reducing chemicals and water soluble dyes that are not destroyed by contact with the stripping chemicals in solution.

In testimony whereof I have affixed my signature.

WOLF KRITCHEVSKY.